United States Patent [19]

Wieme

[11] Patent Number: 4,990,245
[45] Date of Patent: Feb. 5, 1991

[54] SEQUENCE CONTROLLER SYSTEM FOR REGENERATING WATER TREATMENT UNITS

[75] Inventor: Samuel Wieme, Wayne, N.J.

[73] Assignee: The Permutit Company, Paramus, N.J.

[21] Appl. No.: 363,469

[22] Filed: Jun. 8, 1989

[51] Int. Cl.$^5$ .............................................. B01D 21/30
[52] U.S. Cl. .............................. 210/96.1; 137/624.18; 210/138; 210/142; 210/143
[58] Field of Search .................... 137/624.11, 624.18, 137/624.2; 210/96.1, 138, 139, 140, 143, 142; 364/500, 502

[56] References Cited

U.S. PATENT DOCUMENTS

| | | | |
|---|---|---|---|
| 3,366,241 | 1/1968 | McMorris | 210/96.1 |
| 3,482,697 | 12/1969 | Tremont et al. | 210/140 |
| 3,976,101 | 8/1976 | Bassett | 210/138 |
| 4,275,448 | 6/1981 | Ledall | 364/500 |
| 4,490,249 | 12/1984 | Seal | 210/140 |
| 4,536,845 | 8/1985 | Devale et al. | 210/140 |

FOREIGN PATENT DOCUMENTS

| | | | |
|---|---|---|---|
| 627134 | 9/1961 | Canada | 137/624.18 |
| 2651090 | 5/1978 | Fed. Rep. of Germany | 210/138 |
| 2388334 | 12/1978 | France | 210/138 |
| 1450222 | 1/1973 | United Kingdom | 210/140 |
| 2031614 | 4/1980 | United Kingdom | 210/96.1 |

OTHER PUBLICATIONS

Publication by Fuji Electrical Rev., vol. 24, Issue No. 1, "Micro-Controller System for Water and Sewage Works", Ito et al., 1978.

Primary Examiner—Frank Spear
Assistant Examiner—Joseph Drodge
Attorney, Agent, or Firm—Elliot M. Olstein

[57] ABSTRACT

A sequence controller system for regenerating a plurality of water treatment units in a water treatment plant. Each of the water treatment units has a timer and a multi-port valve for sequencing each of the water treatments units through successively repeating cycles of service and regeneration. The sequence controller system has a priority specifying means for setting the time intervals by which only one of each water treatment unit that is ready for regeneration, at the same time, is permitted to begin its regeneration cycle. The sequence controller system also has a common interlock connection between all of the water treatment units to lockout all of the water treatment units from beginning their regeneration cycles except for the water treatment unit that has been priority specified by having the lower set time interval before beginning its regeneration cycle.

6 Claims, 2 Drawing Sheets

SEQUENCE CONTROLLER SYSTEM FOR REGENERATING WATER TREATMENT UNITS

BACKGROUND OF THE INVENTION

The present invention relates to a sequence controller system for regenerating a water treatment plant having a plurality of treatment units for treatment of water flowing therethrough. A water treatment unit may use a chemical process for removing hard salts from hard water by the interchange of cations when the hard water is passed through a resing contained in a treatment tank. Also, water treatment units may use a chemical process for the deionization of salt water to obtain sufficiently pure water for industrial uses. After a preriod of time of extended use the resin used in the chemical process begins to deplete and the water flowing from the water treatment unit begins to deteriorate. At such time depleted resin must be regenerated by passing a regenerating solution through the water treatment unit to restore the resin to its original condition for further service. A water treatment unit may also be a filter which requires periodic backwashing and rinsing.

In the prior art there are problems with the regeneration of a plurality of water treatment units when two or more of the water treatment units are simultaneously ready for regeneration. When two or more water treatment units are simultaneously regenerated the capacity of the remaining water treatment units in service is appreciably diminished so that the treated water flowing therefrom may be unsatisfactory for service. Another problem is that the regeneration of two or more units simultaneously may result in the resin in each of the water treatment units to be improperly regenerated.

It is an object of the present invention to permit the regeneration of only a single water treatment unit at a time by the use of an interlock and a priority circuit utilizing synchronized timing signals to determine the interlock status of each water treatment unit and to establish regenerating priorities between the individual water treatment units in the water treatment plant.

The exact nature of the present invention as well as other objects and advantages thereof will be apparent by consideration of the following specification related to the annexed drawings:

SUMMARY OF THE INVENTION

Figure 1:
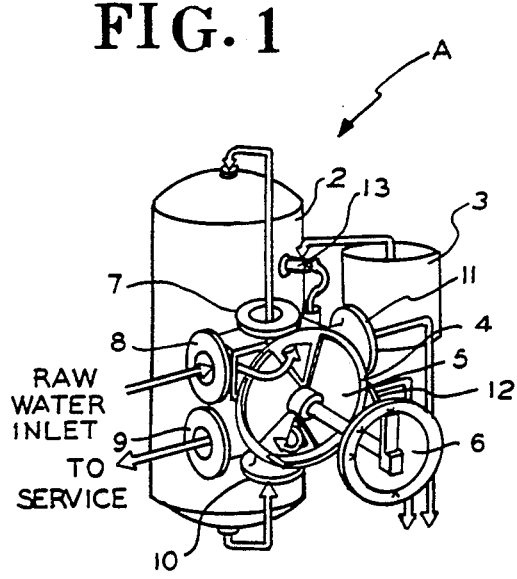
FIG. 1 is a schematic of a water treatment unit in the Service step.

Referring now to FIGS. 1-5, wherein like reference characters designate like parts. There is shown a water treatment unit, generally designated A, comprising a water treatment tank 2 containing an appropriate rasin therein used in treatment of raw water; a brine tank 3 which contains brine therein used in regeneration of the resin in the water treatment tank 2. The water treatment unit A is maintained in operation by a multi-port valve (MPV) 4 which has a rotating valve slide 5 for which a step position is indicated by the indicator 6. The orifice plate 5 controls the flow of water through the MPV 4 through a series of piping inlets/outlets 7, 8, 9, 10, 11, 12 which control the flow of water through the MPV 4 in the operation of the water treatment unit A.

There are four steps in the operation of the water treatment unit A: Service, Backwash, Brine, and Rinse, which are described in detail hereinafter. FIG. 1 shows the water treatment unit A in the Service step wherein raw water enters the MPV 4 through the inlet 8 and passes through outlet 7 to flow from the top of the tank 2 through the resin and out through the bottom of the tank 2 where treated water is collected and directed to service by outlet 9 to users of treated water in the Service step as shown by indicator 6.

Figure 2:
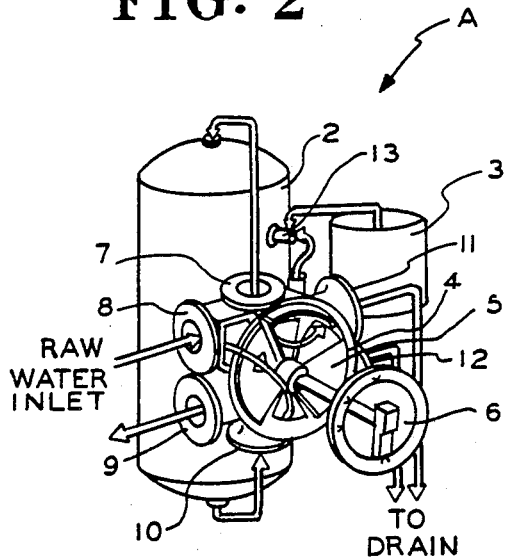
FIG. 2 is a schematic of a water treatment unit in the Backwash step.
Figure 3:
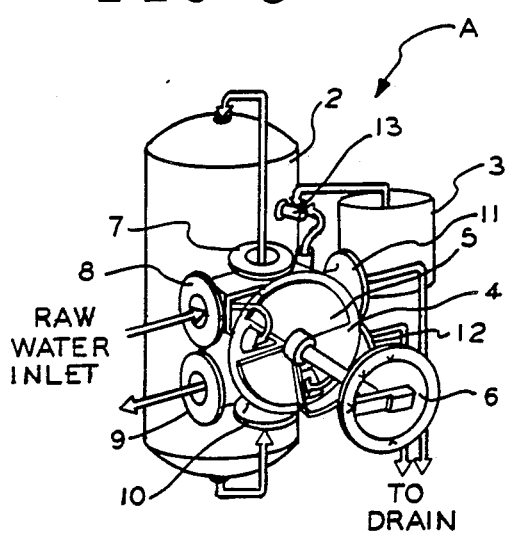
FIG. 3 is a schematic of a water treatment unit in the Brine step.
Figure 4:
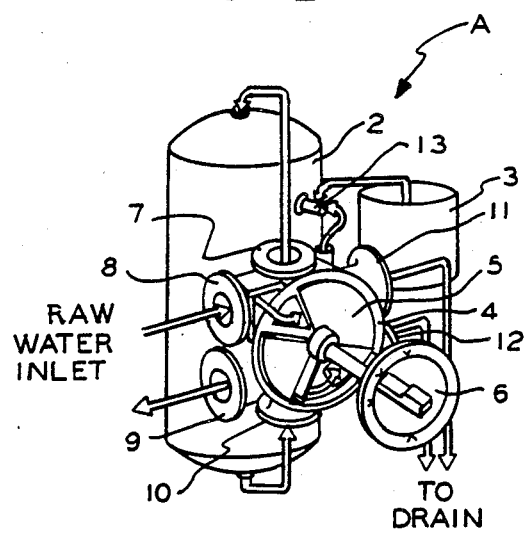
FIG. 4 is a schematic of water treatment unit in the Rinse step.

FIG. 2, 3 and 4 show the three-step regeneration cycle of the water treatment unit A when it is not in the Service step as shown in FIG. 1. When the resin in the water treatment unit A becomes depleted through the continued Service step in FIG. 1 the condition of the treated water to service through outlet 9 begins to deteriorate. This requires a resin regeneration three-step cycle which includes a Backwash as shown in FIG. 2, a Brine step as shown in FIG. 3, and a Rinse step as shown in FIG. 4.

Upon receiving a signal to begin regeneration the water treatment unit A begins its Backwash step in FIG. 2 wherein the raw water enters the MPV 4 through the inlet 8 and flows through outlet 10 to the bottom of the tank 2 and up through the resin to the top of the tank 2 so as to remove sediment from the resin, which sediment is carried to drain through the MPV 4 and outlet 11.

Upon completion of the Backwash step in FIG. 2 the water treatment unit A proceeds through a Brine step as shown in FIG. 3 wherein the brine or some other regenerating solution in tank 3 is circulated by raw water entering the inlet 8, passing through the MPV 4 to draw in the brine in tank 3 through a direct pipe 13 which causes the regenerating solution to flow down through the resin in the tank 2 to the bottom of the tank 2, and to return to the MPV 4 through the outlets 11 and 12 to drain.

FIG. 4 shows the water treatment unit A in the Rinse step of the regeneration cycle after the Brine step the been completed in FIG. 3. In FIG. 4 the raw water enters inlet 8 and passes through the MPV 4. The water then flows from the top of the tank 2, through the resin, and to the bottom of the tank 2 where water is directed through inlet 10, passing again through the MPV 4 and out through outlet 12 to drain. The Rinse step of the regeneration cycle is required in order to remove the last traces of the brine and to purify the resin in the water treatment tank 2. Thereafter the water treatment unit A goes into the Service step as shown in FIG. 1 and continues again through the successively repeating cycles of FIGS. 2-4, and back to FIG. 1, again, as described above.

During the time the water treatment unit A is in the Service step operation as shown in FIG. 1 the resin in the water treatment tank 2 begins to deplete and the condition of the treated water begins to deteriorate as it exits through outlet 9 to the users.

Referring now to FIGS. 1-5 there is shown a microcomputer based controller 14 such as a personal computer that monitors the status of the water treatment unit A and of a second water treatment unit B and determines what position either MPV A, 4, or MPV B, 24 should be in for the proper operation of either water treatment unit A or water treatment unit B. Most of the time, the water treatment unit A is in the Service step. The indicator 6 of water treatment unit A will indicate "Service" while in this step. The controller 14 monitors the water treatment unit A for deterioration of water quality. When the deterioration reaches an unacceptable level, the resin within the tank 2 of the water treatment unit A is said to be depleted, and the controller 14 energizes the MPV A, 4, so that it rotates its orifice plate 5 to the "Wash" position. This is the Backwash first step of the three-step regeneration cycle: Backwash, Brine, Rinse.

Figure 5:
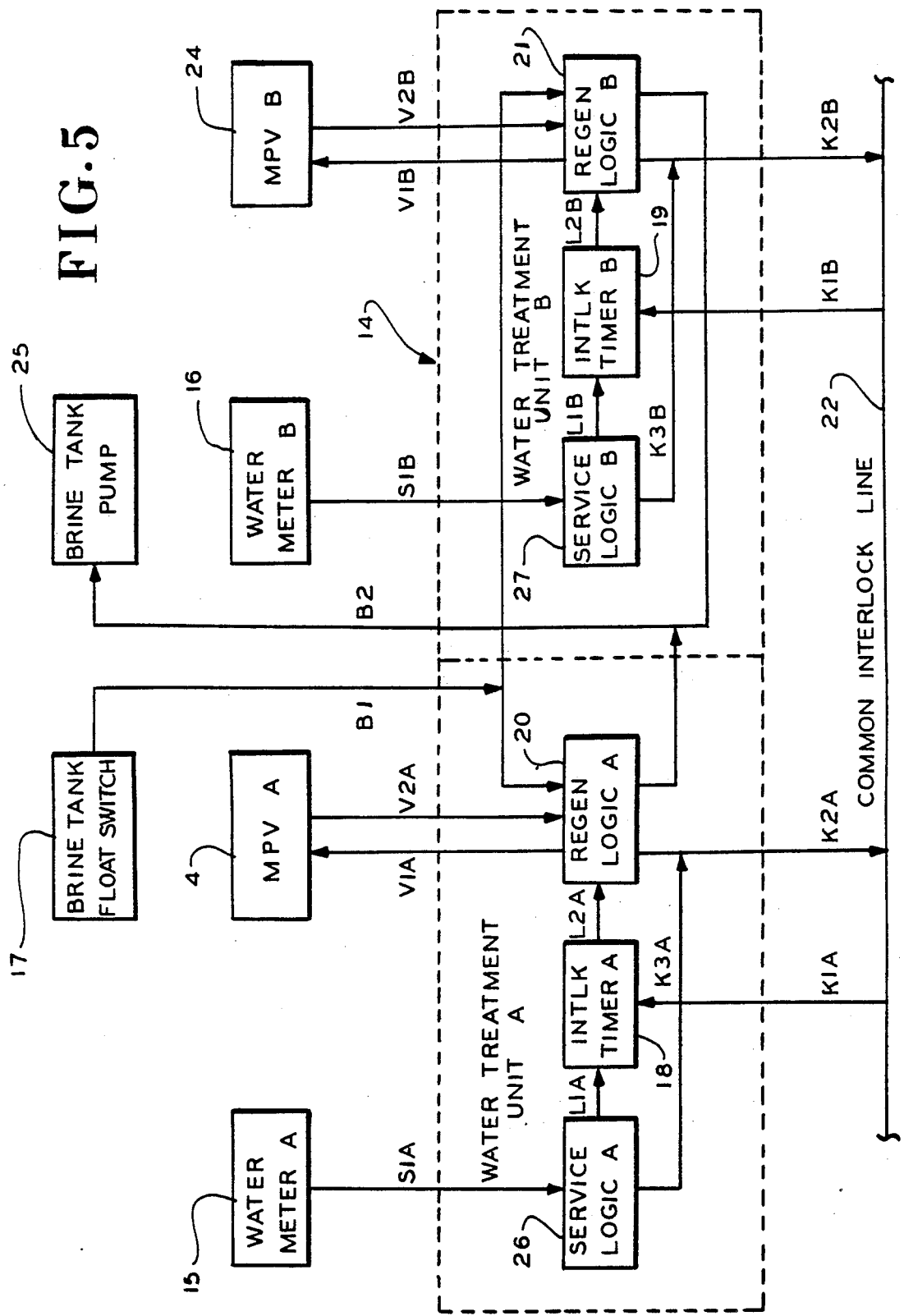
FIG. 5 is a schematic of the interlock and priority circuit of the present invention.

Each time the controller 14 is stepped from one position to the next, the water treatment unit A will remain in its new position for a period of time. During this time the power to its MPV 4 is removed, and the MPV 4 is stationary. The controller 14 monitors the status of the water treatment unit A (via related signal elements as shown in FIG. 5) to determine how long the MPV 4 must remain in its present position. The deteriorated water signal elements in FIG. 5 may be either external contacts from water meters 15, 16, a hardness tester, or internal timers. When the controller 14 receives a signal of the deteriorated water condition in the Service step shown in FIG. 1 the controller 14 applies power to the MPV A, 4 until it reaches its next step position as shown in FIGS. 2-4.

Each position of the MPV A, 4 requires an exact alignment of the slide 5 so as to precisely stop the MPV A, 4 in the positions shown in FIGS. 1-4. The controller 14 receives a signal from a switch assembly amounted to the slide 5 which indicates that the MPV A, 4 has reached its destination for the steps shown in FIGS. 1-4. Upon receiving the indicating signal from the slide 5, the controller 14 instantly removes power from the MPV A, 4 and begins to monitor the signal elements in preparation for the next step. Upon completion of the three-step regeneration cycle (Backwash in FIG. 2, Brine in FIG. 3, and Rinse in FIG. 4) the MPV A, 4 is driven back to the Service step position in FIG. 1 and stays there as long as the water treatment unit A is capable of producing acceptable water. When the water treatment unit is a filter unit, the cycle is a two-step cycle wherein the Brine step in FIG. 3 is omitted by keeping power in the MPVA 4, until it rotates the slide 5 from the Backwash step in FIG. 2 to the Rinse step in FIG. 4.

Referring now to FIG. 5 the sequence controller system of the present invention is for a first water treatment unit A and a second water treatment unit B. The sequence controller system is fully automatic with each water treatment unit returning immediately to "Serveic" after a regeneration cycle as shown in FIGS. 2-4.

FIG. 5 shows the situation wherein water treatment unit A is in need of regeneration. Water treatmemt unit A will remain in service until water meter A 15 sends a signal, S1A to service logic A, 26 indicating a deteriorated water condition and a need for regeneration. Service logic A, 26, will acknowledge this signal, S1A, which is also a request that the water treatment unit A be permitted to regenerate. Service logic A, 26, will also send out a momentary (one second) pulse K3A to energize the common interlock line between the water treatment units A and B. This is done in order to synchronize the interlock timers A and B, 18, 19 in a case where more than one unit is ready to regenerate. The interlock timer A, 18, will pass the L1A signal request via L2A to regeneration logic A, 20, only if the common interlock line 22 is de-energized via the interlock input signal K1A. The request signal S1A for regeneration is not passed to the regeneration logic A 20 instantaneously, however, because the interlock timer A, 18, must time out first. The timer value is in seconds and corresponds to the priority designation of the water treatment unit in a group of water treatment units. For this system water treatment A would have a value of one second and water treatment unit B would have a value of two seconds. The regeneration logic A, 20, begins the regeneration cycle by re-energizing the common interlock line 22 via signal K2A. The purpose of re-energizing the common interlock line 22 is to prevent another water treatment unit, in this case water treatment unit B, from regenerating while water treatment unit A is regenerating. Only one water treatment unit at a time will be allowed to regenerate because: (1) water treatment unit systems are normally sized so that only one water treatment unit can be out of service at a time so as to provide treated water that can be tolerated by the user, and (2) the regeneration system, primarily the brine tank capacity and piping, is normally sized to support a single regeneration of a water treatment unit at one time. The regeneration logic A, 20, energizes the power source for MPV A, 4, through the the signal V1A in order to step the MPV slide 5 to the "Backwash" position. Verification that the, MPV 4 is in the "Backwash" position is received by regeneration logic A 20 via signal V2A and the power is de-energized to the MPV A, 4. While in the "Backwash" position, a timer will count off a period of approximately 10 minutes.

The regeneration logic A, 20, energizes the power source for the MPV A, 4, via signal V1A in order to step the slide 5 to the Brine position. Verification that the MPV A, 4, is in the Brine position is given by signal V2A and the power to MPV A, 4, is turned off. The first thing the controller 14 does upon reaching the Brine step is to turn on the brine tank pump 25 which forces the concentrated brine through a port and into the water treatment tank 2. At the same time, dilution water passing through the MPV A, 4, is fed into another port in direct pipe 13 so as to dilute the brine into the proper concentration. While in the Brine step the controller 14 awaits a signal of metered brine solution output which signifies the end of the Brine step. This signal may come from an internal timer or an external switch closure from a brine flow meter or from a brine tank float switch 17. Upon receiving the end of the Brine step signal, the controller 14 turns off the brine tank pump 25 and then energizes the power for the MPV A, 4, via signal V1A in order to step the slide 5 to the Rinse step. Verification that the MPV A, 4 is the Rinse step is received via signal V2A, and then the MPV A, 4, is turned off. While in the Rinse step, a timer will count off a period of approximately 35 minutes. The regeneration logic A, 20, then energizes the MPV A, 4, to the Service step. Verification that the MPV A, 4, is in the Service step is received via signal V2A, and the power is turned off to MPV A, 4, via signal V1A in order to step the MPV orifice plates to the Service step. Verification that the MPV A, 4, is in the Service step is received by the regeneration logic A, 20, via signal V2A, and the power to the MPVA 4, is turned off.

It is possible that both water treatment unit A and water treatment unit B may reach depletion of the resin at the same time and both water treatment units may attempt to regenerate. Since only one water treatment unit at a time can be allowed to regenerate, as explained above, it is the task of the interlock circuitry to determine which unit will be permitted to regenerate first and which unit will be kept in service. With both units reaching depletion at the same time, the water meters A and B, 15 and 16, the service logic A and B, 26 and 27 of the controller 14 will each request permission to regenerate at the same time, and the interlock timers. A and B 18, 19, will begin to count off there respective accumulated time values until the water treatment unit with the lower present time (or higher priority) finishes its count first. The timer with the lower preset time value, having reached its setting first, will pass its regenerating request onto its associated regeneration logic A or B, 20 or 21. The purpose in doing this is to reset interlock timer B, 19, and prevent it from timing out and thus passing its regenerating request signal onto regeneration logic B, 21. Water treatment unit B will thereby have to remain in the Service step until water treatment unit A returns to service after its regeneration cycle. It water treatment unit B (or still another water treatment unit) becomes depleted, measured in seconds of priority, after water treatment unit A's interlock timer A, 18, has already started to count, then the following will occur: the service logic of each water treatment unit provides a momentary pulse to the common interlock line 22, for the purpose of synchronizing interlock timers. This is done by resetting all interlock timers to zero regardless of how close they may have come to timing out. When the synchronizing pulse ends, all interlock timers start timing from zero as they did previously. As before, the interlock timer with the lowerst time setting will be prioritized to time out first allowing the associated water treatment unit to go through its regenerating cycle first even though it may have been the second unit depleted. If several water treatment units (in water treatment plants with more than two water treatment units) become depleted after the first unit has started regeneration, they will have to stay in service until the common interlock line 22 is energized. When the regenerating water treatment unit returns to service, the water treatment units that are ready to regenerated will be regenerated in the priority order of their interlock timers timing out, not in the order fo their depletion. The common interlock line 22 with its inherent priority structure permits the user to regenerate many water treatment units sequentially without running into the problems associated with simultaneous regeneration. The interlock timer preset values used to establish water treatment unit regeneration priorities are easily changed by the user with the operator interface to the controller 14. The common interlock line 22 uses only one wire and is connected in parallel fashion to all of the water treatment units. This permits water treatment units to be added to or deleted from the sequence controller system of the present invention without the need to rewire or add parts.

It will be understood that the present invention is not limited to the structure or components disclosed hereinabove by way of example.

The scope of the present invention is limited only by the appended claims.

What is claimed is:

1. A sequence controller system for regenerating a water treatment plant comprising:
   a plurality of water treatment units for treatment of water flowing through said treatment units, each of said treatment units having a timer and a sequencing means for sequencing of each of said treatment units through successively repeating cycles of service and regeneration;
   priority specifying means for setting time intervals in each of said timers to establish a regeneration priority for each treatment unit prior to any unit beginning a regeneration cycle which is activated when two or more treatment units have completed their service cycles at the same time;
   means for energizing saidسequencing means to begin the regeneration cycle only for the treatment unit whose timer has first completed its set time interval; and
   means for locking out all of said treatment units from beginning their regeneration cycles except for that water treatment unit which has begun its regeneration cycle.

2. The sequence controller system of claim 1 wherein the water treatment unit is a water softening unit, or a water deionizing unit, or a water filtering unit.

3. The sequence controller system of claim 1 wherein the sequence controller is a microcomputer based personal computer.

4. The sequence controller system of claim 1 wherein the sequencing means is a multi-port valve.

5. A sequence controller system for regenerating a water treatment plant comprising:
   a plurality of water treatment units for treatment of water flowing through said treatment units, each of said treatment units having a timer and a sequencing means for sequencing of each of said treatment units through successively repeating cycles of service and regeneration;
   detecting means for outputting a signal of deteriorated condition of the water flowing through each of said treatment units during its service cycle;
   priority specifying means for setting time intervals in each of said timers to establish a regeneration priority for each treatment unit which is activated after receipt of the outputted signal of deteriorated condition of the water .rom two or more treatment units at the same time;
   means for energizing said sequencing means to begin the regeneration cycle of the first treatment unit for which its timer has first completed its set time interval; and
   a common interlock connection between all of said treatment units to lockout all of said water treatment units from beginning their regeneration cycles except for that water treatment unit which has begun its regeneration cycle.

6. The sequence controller system of claim 5 wherein the detecting means for outputting a signal of deteriorated condition of the water flowing through each of said treatment units is water meter or a hardness meter or a timer.

* * * * *